(12) United States Patent
Matsubara et al.

(10) Patent No.: US 9,740,189 B2
(45) Date of Patent: Aug. 22, 2017

(54) MACHINING PROGRAM CREATING APPARATUS, MACHINING PROGRAM CREATING METHOD, AND MACHINING PROGRAM CREATING PROGRAM

(75) Inventors: Susumu Matsubara, Tokyo (JP); Mitsuo Maehara, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 564 days.

(21) Appl. No.: 14/371,797

(22) PCT Filed: Mar. 2, 2012

(86) PCT No.: PCT/JP2012/055352
§ 371 (c)(1),
(2), (4) Date: Jul. 11, 2014

(87) PCT Pub. No.: WO2013/128625
PCT Pub. Date: Sep. 6, 2013

(65) Prior Publication Data
US 2015/0005924 A1    Jan. 1, 2015

(51) Int. Cl.
G05B 19/402    (2006.01)
G05B 19/19    (2006.01)
G05B 19/4093    (2006.01)

(52) U.S. Cl.
CPC ........... G05B 19/19 (2013.01); G05B 19/402 (2013.01); G05B 19/4093 (2013.01);
(Continued)

(58) Field of Classification Search
None
See application file for complete search history.

(56) References Cited

U.S. PATENT DOCUMENTS 4,115,956 A * 9/1978 Huffman ............... B23Q 11/10
451/4
5,493,193 A * 2/1996 Seki ................. G05B 19/40932
318/570
(Continued)

FOREIGN PATENT DOCUMENTS

JP    57-144646 A    9/1982
JP    62-69301 A    3/1987
(Continued)

OTHER PUBLICATIONS

Notice of Rejection Issued in the Corresponding JP Application No. 2012-535470 A, issued Nov. 6, 2012.
(Continued)

*Primary Examiner* — Isaac T Tecklu
(74) *Attorney, Agent, or Firm* — Sughrue Mion, PLLC; Richard C. Turner

(57) ABSTRACT

A machining program creating apparatus includes a tool-route generating unit sequentially executing, concerning each line segment, processing for setting an end point of a set tool route as an endpoint of interest and setting a line segment connected to the endpoint of interest as a next tool route and an NC-machining-program-creation processing unit creating the NC machining program. When a line segment not set as a tool route yet is present among line segments connected to the endpoint of interest, the tool-route generating unit sets the line segment not set as a tool route as a next tool route, and, otherwise, the tool route generating unit sets a line segment already set as a tool route as a tool route again between the endpoint of interest and an endpoint forming a line segment not set as a tool route yet.

8 Claims, 17 Drawing Sheets

(52) U.S. Cl.
CPC ............ *G05B 2219/45212* (2013.01); *G05B 2219/49001* (2013.01); *G05B 2219/50047* (2013.01); *Y02P 90/265* (2015.11)

(56) References Cited

U.S. PATENT DOCUMENTS

| | | | | |
|---|---|---|---|---|
| 5,663,803 | A | * | 9/1997 | Beckett ............... B41C 1/04 358/3.27 |
| 5,775,215 | A | * | 7/1998 | Hirate ................ G01D 9/40 101/35 |
| 6,658,316 | B1 | * | 12/2003 | Mehta ............... G05B 19/4093 700/117 |
| 2010/0185310 | A1 | * | 7/2010 | Miyata ............. G05B 19/40937 700/98 |
| 2010/0305745 | A1 | * | 12/2010 | Iriguchi ............. G05B 19/4097 700/186 |
| 2011/0235134 | A1 | * | 9/2011 | Hasegawa ................ B41J 2/32 358/474 |
| 2012/0283862 | A1 | * | 11/2012 | Nonaka ............. G05B 19/4069 700/97 |

FOREIGN PATENT DOCUMENTS

| | | | |
|---|---|---|---|
| JP | 1-175005 | A | 7/1989 |
| JP | 1-274948 | A | 11/1989 |
| JP | 6-31590 | A | 2/1994 |
| JP | 6-43924 | A | 2/1994 |
| JP | 06043924 | A | * 2/1994 |
| JP | 6-210548 | A | 8/1994 |
| JP | 6-242814 | A | 9/1994 |
| JP | 2637131 | B2 | 4/1997 |
| JP | 2637132 | B2 | 4/1997 |
| JP | 9-120310 | A | 5/1997 |
| JP | 2658134 | B2 | 6/1997 |
| JP | 2000-155609 | A | 6/2000 |
| JP | 2005-81531 | A | 3/2005 |
| JP | 2008-116996 | A | 5/2008 |

OTHER PUBLICATIONS

International Search Report of PCT/JP2012/055352, dated Jun. 5, 2012.

* cited by examiner

FIG.8

| FONT | STROKE FONT |
|---|---|
| STYLE | STANDARD |
| POINT | 72 |
| POSITION VECTOR ON PLANE | (0, 0, 0) |
| NORMAL VECTOR ON PLANE | (0, 0, 1) |
| POSITION OF CHARACTER | (-23, 2) |
| DIRECTION OF CHARACTER | (1, 0) |

FIG.9

| TOOL IN USE | DIAMETER 8 SQUARE END MILL |
|---|---|
| Z-AXIS DIRECTION MACHINING ALLOWANCE | 4 |
| CIRCUMFERENTIAL SPEED | 17 |
| TOOL FEED | 0.077 |

| ENDPOINT 151 | CROSSING ENDPOINT |
| ENDPOINT 152 | CONNECTION ENDPOINT |
| ENDPOINT 153 | CROSSING ENDPOINT |
| ENDPOINT 154 | CONNECTION ENDPOINT |
| ENDPOINT 155 | CROSSING ENDPOINT |
| ENDPOINT 156 | CONNECTION ENDPOINT |

| ROUTE No. | ROUTE |
|---|---|
| 1 | ENDPOINT 152 TO ENDPOINT 151 |
| 2 | ENDPOINT 151 TO ENDPOINT 153 |
| 3 | ENDPOINT 153 TO ENDPOINT 154 TO ENDPOINT 153 |
| 4 | ENDPOINT 153 TO ENDPOINT 155 |
| 5 | ENDPOINT 155 TO ENDPOINT 156 |

FIG.17

| ENDPOINT 251 | CONNECTION ENDPOINT |
| --- | --- |
| ENDPOINT 252 | CROSSING ENDPOINT |
| ENDPOINT 253 | CROSSING ENDPOINT |
| ENDPOINT 254 | CONNECTION ENDPOINT |

FIG.18

| ROUTE No. | ROUTE |
| --- | --- |
| 11 | ENDPOINT 251 TO ENDPOINT 252 |
| 12 | ENDPOINT 252 TO ENDPOINT 253 |
| 13 | ENDPOINT 253 TO ENDPOINT 254 |

| ENDPOINT 351 | CONNECTION ENDPOINT |
| ENDPOINT 352 | CROSSING ENDPOINT |
| ENDPOINT 353 | CONNECTION ENDPOINT |
| ENDPOINT 354 | CONNECTION ENDPOINT |

| ROUTE No. | ROUTE |
|---|---|
| 21 | ENDPOINT 351 TO ENDPOINT 352 |
| 22 | ENDPOINT 352 TO ENDPOINT 354 TO ENDPOINT 352 |
| 23 | ENDPOINT 352 TO ENDPOINT 353 |

FIG.23

| | 12 |
|---|---|
| ENDPOINT 451 | CONNECTION ENDPOINT |
| ENDPOINT 452 | CONNECTION ENDPOINT |
| ENDPOINT 453 | CROSSING ENDPOINT |
| ENDPOINT 454 | CONNECTION ENDPOINT |
| ENDPOINT 455 | CROSSING ENDPOINT |
| ENDPOINT 456 | CROSSING ENDPOINT |
| ENDPOINT 457 | CROSSING ENDPOINT |
| ENDPOINT 458 | CROSSING ENDPOINT |
| ENDPOINT 459 | CROSSING ENDPOINT |
| ENDPOINT 460 | CROSSING ENDPOINT |
| ENDPOINT 461 | CROSSING ENDPOINT |
| ENDPOINT 462 | CROSSING ENDPOINT |
| ENDPOINT 463 | CROSSING ENDPOINT |
| ENDPOINT 464 | CONNECTION ENDPOINT |
| ENDPOINT 465 | CROSSING ENDPOINT |
| ENDPOINT 466 | CONNECTION ENDPOINT |
| ENDPOINT 467 | CONNECTION ENDPOINT |

FIG.24

| ROUTE No. | ROUTE |
|---|---|
| 1 | ENDPOINT 452 TO ENDPOINT 453 |
| 2 | ENDPOINT 453 TO ENDPOINT 451 TO ENDPOINT 453 |
| 3 | ENDPOINT 453 TO ENDPOINT 454 TO ENDPOINT 453 |
| 4 | ENDPOINT 453 TO ENDPOINT 456 |
| 5 | ENDPOINT 456 TO ENDPOINT 459 TO ENDPOINT 458 TO ENDPOINT 455 TO ENDPOINT 456 |
| 6 | ENDPOINT 456 TO ENDPOINT 457 |
| 7 | ENDPOINT 457 TO ENDPOINT 460 |
| 8 | ENDPOINT 460 TO ENDPOINT 463 TO ENDPOINT 462 TO ENDPOINT 459 TO ENDPOINT 460 |
| 9 | ENDPOINT 460 TO ENDPOINT 463 TO ENDPOINT 462 |
| 10 | ENDPOINT 462 TO ENDPOINT 461 TO ENDPOINT 458 TO ENDPOINT 461 TO ENDPOINT 462 |
| 11 | ENDPOINT 462 TO ENDPOINT 465 |
| 12 | ENDPOINT 465 TO ENDPOINT 467 TO ENDPOINT 465 |
| 13 | ENDPOINT 465 TO ENDPOINT 466 TO ENDPOINT 465 |
| 14 | ENDPOINT 465 TO ENDPOINT 464 |

# MACHINING PROGRAM CREATING APPARATUS, MACHINING PROGRAM CREATING METHOD, AND MACHINING PROGRAM CREATING PROGRAM

CROSS REFERENCE TO RELATED APPLICATIONS

This application is a National Stage of International Application No. PCT/JP2012/055352 filed Mar. 2, 2012, the contents of all of which are incorporated herein by reference in their entirety.

FIELD

The present invention relates to a machining program creating apparatus, a machining program creating method, and a machining program creating program for creating an NC machining program for causing a numerical control apparatus to execute numerical control (hereinafter NC) for a machine tool.

BACKGROUND

In recent years, a program creation supporting function of a machining program creating apparatus has been improved. For example, an operator can create an NC machining program simply by setting coordinate values of a workpiece (work) in the machining program creating apparatus while looking at manufacturing drawings. There is also a machining program creating apparatus that enables a designer to directly read CAD data modeled using a CAD system and create an NC machining program from the read CAD data.

When causing a machine tool to engrave characters, in order to reduce a machining time as much as possible, there is a demand for creating an NC machining program for moving a tool along as efficient a route as possible.

As a technology related to the demand, Patent Literature 1 discloses a technology for, in continuously subjecting a plurality of sections to be machined of a workpiece to NC machining in a form of using the same tool and reciprocatingly moving the tool a plurality of times for each of the sections to be machined, concerning tool tracks respectively calculated for the sections to be machined, storing the positions of endpoints that could be the machining start points or the machining end points and selecting, as the next machining start point, the endpoint of the tool track of another section to be machined, the endpoint being at the shortest moving distance of the tool from the machining end point of the tool track in one section to be machined.

Patent Literature 2 discloses a technology for, in engraving characters on an object surface, engraving the characters at the engraving depth associated with the thickness of the characters for each of the sections of the characters on the basis of data representing the planar shapes of the characters and data representing the engraving depths of the characters associated with the thicknesses of the sections of the characters.

CITATION LIST

Patent Literature

Patent Literature 1: Japanese Patent Application Laid-Open No. H6-31590

Patent Literature 2: Japanese Patent Application Laid-Open No. H1-274948

SUMMARY

Technical Problem

When a character is engraved, the total machining time is longer as the number of times a tool is caused to escape or approach in the Z-axis direction is larger. The shape of a character is sometimes formed by a plurality of tool routes in X and Y-axis directions that cross each other. As a method of machining the tool routes that cross each other, it is conceivable to perform the tool approach in the Z-axis direction again for a machined tool route and machine another tool route that crosses the machine route. However, with this method, a machining mark due to the tool approach in the Z-axis direction is formed on a part on the machined tool route where the tool approach in the Z-axis direction is performed. The technologies described in Patent Literatures 1 and 2 do not take into account the number of times the tool approach in the Z-axis direction is performed. Therefore, the technologies have room for a further reduction of the machining time. Further, the technologies described in Patent Literatures 1 and 2 cannot suppress occurrence of a machining mark due to the tool approach in the Z-axis direction.

The present invention has been devised in view of the above and it is an object of the present invention to obtain a machining program creating apparatus, a machining program creating method, and a machining program creating program for creating an NC machining program for executing character engraving in as short a machining time as possible.

Solution to Problem

In order to solve the above problems and achieve the object, the present invention is a machining program creating apparatus that creates an NC machining program for executing character engraving on a workpiece, including a tool-route generating unit that generates a plurality of line segments by dividing a line segment forming a character that is a character engraving target at an intersection position of the character and sequentially executes processing for setting an end point of a set tool route as a start point and setting a line segment connected to the start point as a next tool route; and an NC-machining-program-creation processing unit that creates an NC machining program for moving a tool along the set tool route in order set by the tool-route generating unit, wherein when a line segment not set as a tool route yet is present among line segments connected to the start point, the tool-route generating unit sets the line segment not set as a tool route as a next tool route, and, when a line segment not set as a tool route yet is not present, the tool-route generating unit sets a line segment that is already set as a tool route as a tool route again between the start point and an endpoint forming a line segment not set as a tool route yet.

Advantageous Effects of Invention

The machining program creating apparatus according to the present invention creates an NC machining program for moving a tool from an independent endpoint to a connection endpoint or a crossing endpoint without causing the tool to execute a tool approach in the Z-axis direction. Therefore, it is possible to create an NC machining program for executing character engraving in as a short machining time as possible.

BRIEF DESCRIPTION OF DRAWINGS

FIG. 8 is a diagram explaining a data configuration example of character setting data.

FIG. 9 is a diagram explaining a data configuration example of character engraving data.

FIG. 17 is a diagram of an initial state of classification data related to the character "N".

FIG. 18 is a diagram of a data configuration example of tool route information related to the character "N".

FIG. 23 is a diagram of an initial state of classification data related to the character "kuruma in a Chinese character".

FIG. 24 is a diagram of a data configuration example of tool route information related to the character "kuruma in a Chinese character".

DESCRIPTION OF EMBODIMENTS

Embodiments of a machining program creating apparatus, a machining program creating method, and a machining program creating program according to the present invention are explained in detail below with reference to the drawings. Note that the present invention is not limited by the embodiments.

First Embodiment

Figure 1:
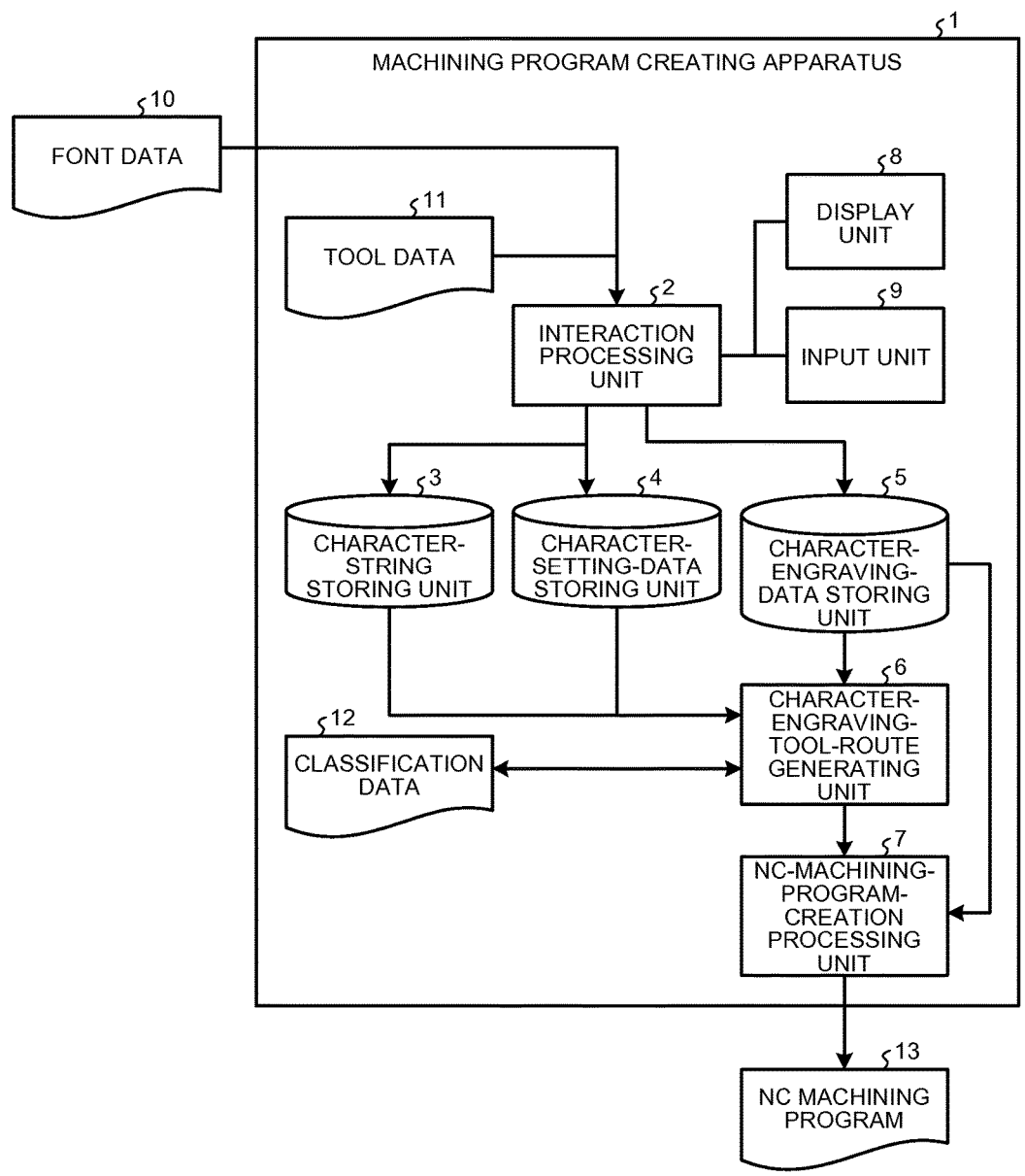
FIG. 1 is a diagram explaining the configuration of a machining program creating apparatus in a first embodiment of the present invention.

FIG. 1 is a diagram explaining the configuration of a machining program creating apparatus in a first embodiment of the present invention. As shown in the figure, a machining program creating apparatus 1 includes an interaction processing unit 2, a character-string storing unit 3, a character-setting-data storing unit 4, a character-engraving-data storing unit 5, a character-engraving-tool-route generating unit 6, an NC-machining-program-creation processing unit 7, a display unit 8, and an input unit 9.

The input unit 9 includes a mouse and a keyboard and receives an input of instruction information (a character string, character setting data, and character engraving data) from an operator. The display unit 8 is a display device such as a liquid crystal monitor. The display unit 8 displays display information for the operator, such as a character string designated by the operator, character setting data set by the operator, and character engraving data.

The interaction processing unit 2 sends a character string input by the operator via the input unit 9 to the character-string storing unit 3 and sends character setting data input by the operator via the input unit 9 to the character-setting-data storing unit 4. The character setting data is attribute information indicating as what mode of a shape the character string is engraved. The character setting data includes, for example, designation of the font of characters, designation of the size of characters, designation of the intervals between characters, designation of the positions of characters, and designation of the direction of characters.

Further, the interaction processing unit 2 generates a prediction diagram of a finished shape by applying font data 10 input from the outside and the character setting data stored in the character-setting-data storing unit 4 to the character string stored in the character-string storing unit 3 and displays the generated prediction diagram on the display unit 8.

The interaction processing unit 2 sends character engraving data input by the operator to the character-engraving-data storing unit 5. The character engraving data includes designation of a tool type of a tool in use, designation of the tool circumferential speed, designation of the cutting feed speed, designation of the rapid feed speed, and the like. Note that the interaction processing unit 2 displays, on the display unit 8, tool data 11 describing a list of usable tools. When the operator selects a tool that the operator desires to use out of the tools displayed on the display unit 8 as a list, the interaction processing unit 2 writes a description designating the selected tool in the character engraving data.

The character-engraving-tool-route generating unit 6 calculates the machining shape, the machining position, and the machining direction of a character to be engraved from the character string stored in the character-string storing unit 3 and the character setting data stored in the character-setting-data storing unit 4, and generates, on the basis of the calculated information, tool route information (tool route information 14) describing a tool route. The character-engraving-tool-route generating unit 6 inputs the generated tool route information 14 to the NC-machining-program-creation processing unit 7. In generating the tool route, the character-engraving-tool-route generating unit 6 generates classification data 12 as intermediate data. The classification data 12 is explained below.

The NC-machining-program-creation processing unit 7 creates an NC machining program 13 on the basis of, for example, the shapes and the positions of graphic elements forming the tool route described in the tool route information 14 input from the character-engraving-tool-route generating unit 6 and detailed information of the tools stored in the character-engraving-data storing unit 5. The NC-machining-program-creation processing unit 7 outputs the created NC machining program 13 to the outside.

Figure 2:
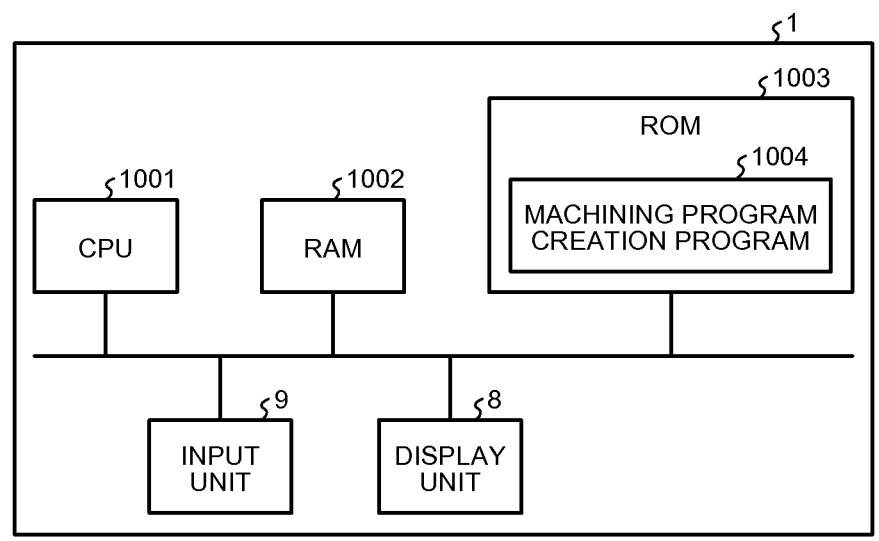
FIG. 2 is a diagram explaining a hardware configuration example of the machining program creating apparatus.

FIG. 2 is a diagram explaining a hardware configuration example of the machining program creating apparatus 1. As shown in the figure, the machining program creating apparatus 1 includes a CPU (Central Processing Unit) 1001, a RAM (Random Access Memory) 1002, a ROM (Read Only Memory) 1003, the display unit 8, and the input unit 9. The CPU 1001, the RAM 1002, the ROM 1003, the display unit 8, and the input unit 9 are connected to one another by a bus.

In the ROM 1003, a machining program creating program 1004, which is a computer program for realizing a machining program creating method, is recorded. The CPU 1001 reads the machining program creating program 1004 recorded in the ROM 1003 and loads the read machining program creating program 1004 to a program loading area of the RAM 1002. The CPU 1001 functions as the interaction processing unit 2, the character-engraving-tool-route generating unit 6, and the NC-machining-program-creation processing unit 7 according to control by the machining program creating program 1004 loaded in the RAM 1002.

The RAM 1002 functions as the character-string storing unit 3, the character-setting-data storing unit 4, and the character-engraving-data storing unit 5. The RAM 1002 includes a work area for temporarily storing the font data 10 and the tool data 11 input from the outside and the classification data 12 generated by the character-engraving-tool-route generating unit 6. The NC machining program 13 generated by the CPU 1001 is output to the RAM 1002 and a not-shown external storage device.

Note that a recording medium that records the machining program creating program 1004 in advance is not limited to only the ROM 1003. Any recording medium can be applied as the recording medium as long as the recording medium is a non-transitory tangible medium, such as an external storage device, a detachable memory device, an optical disk, and a magnetic disk. The machining program creating program 1004 can be stored in a computer connected to a network, such as the Internet, and provided or distributed by being downloaded through the network.

Figure 3:
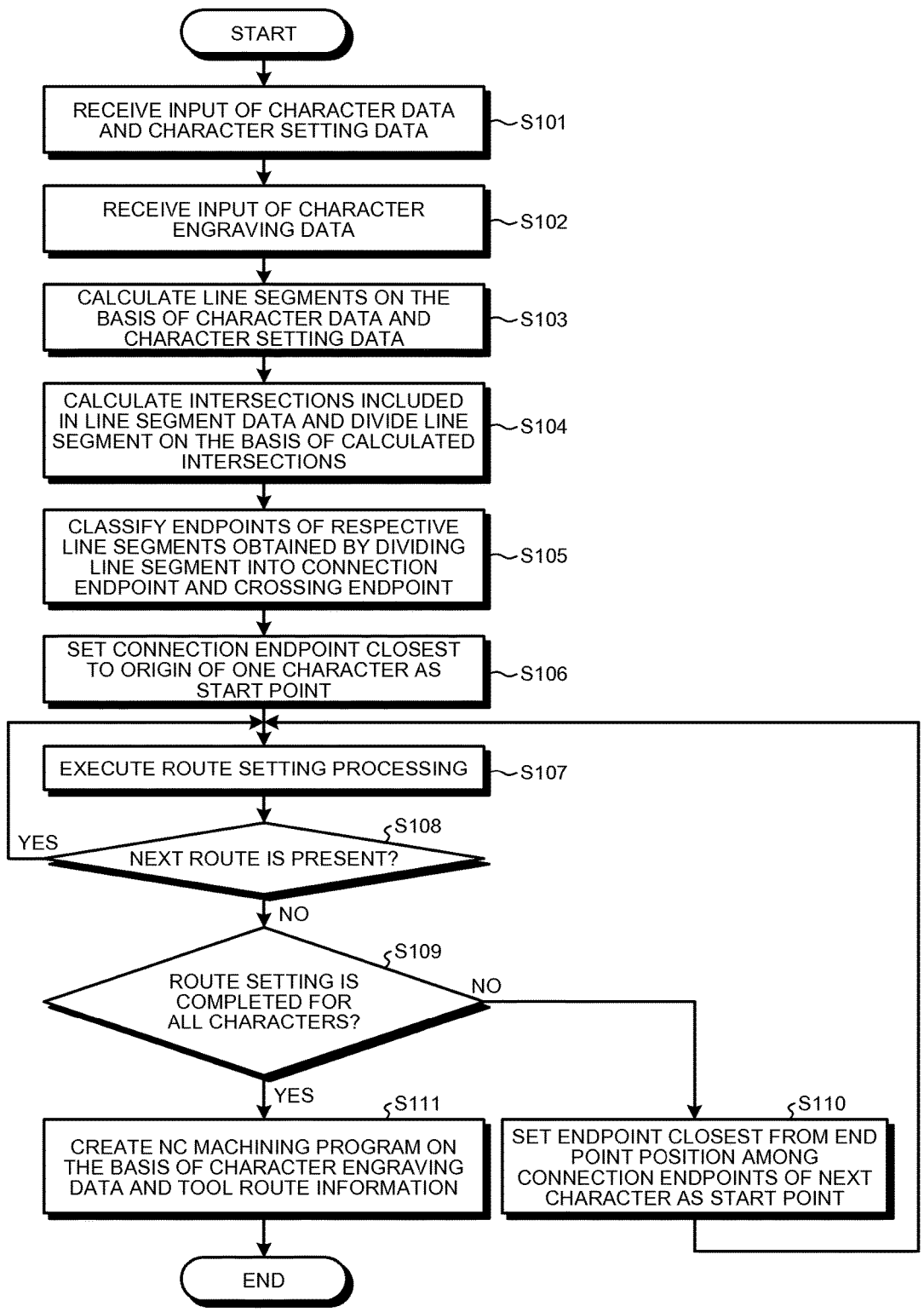
FIG. 3 is a flowchart explaining a machining program creating method in the first embodiment.

A machining program creating method in the first embodiment realized by the machining program creating apparatus 1 explained above is explained with reference to a specific example. FIG. 3 is a flowchart explaining the machining program creating method in the first embodiment.

First, the interaction processing unit 2 receives an input of a character string and character setting data (step S101).

Figure 4:
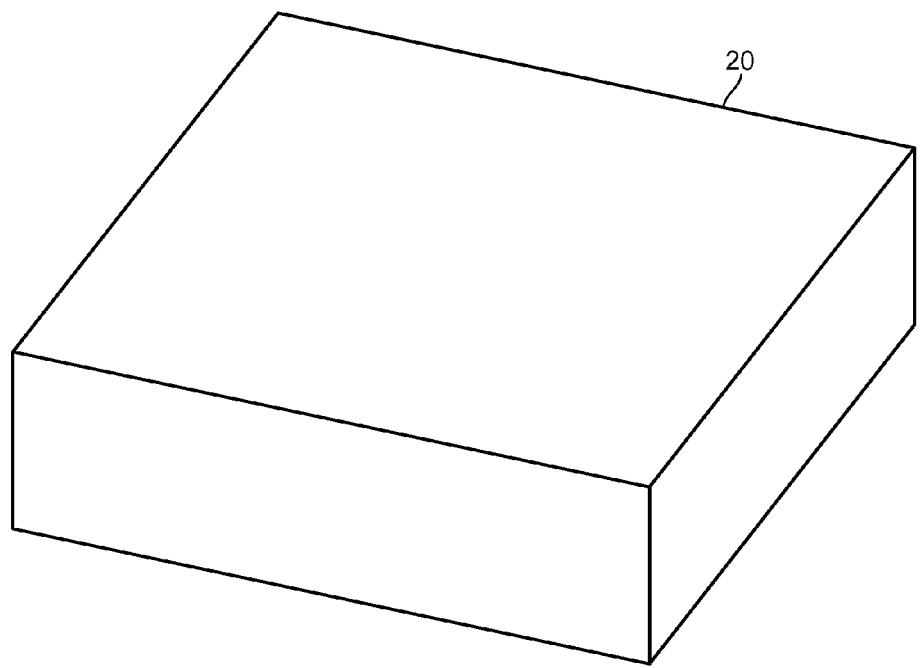
FIG. 4 is a diagram of a display example of a material shape.
Figure 5:
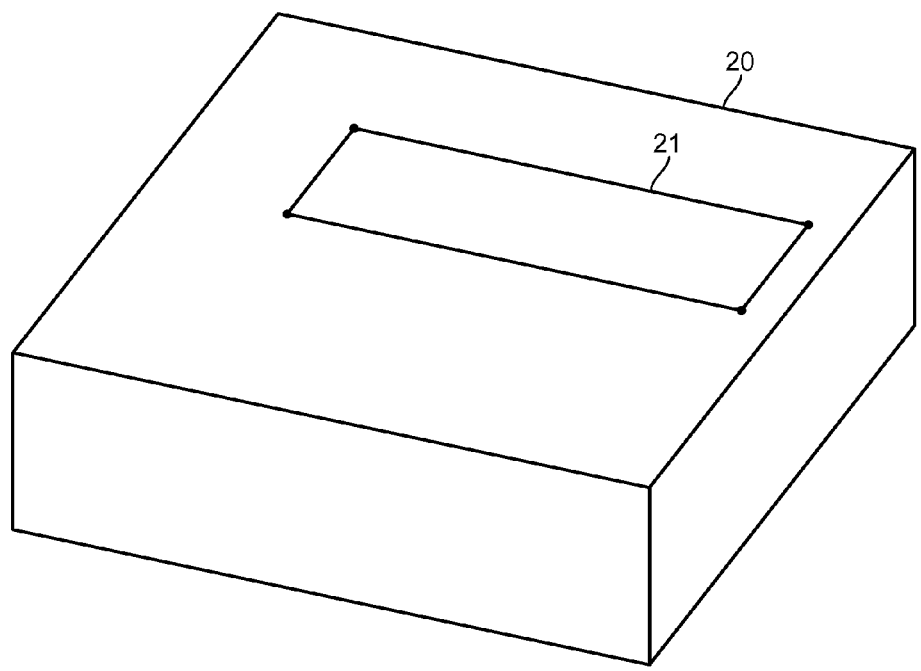
FIG. 5 is a diagram explaining a state in which a surface on which and a range on and in which a character string is engraved are designated.
Figure 6:
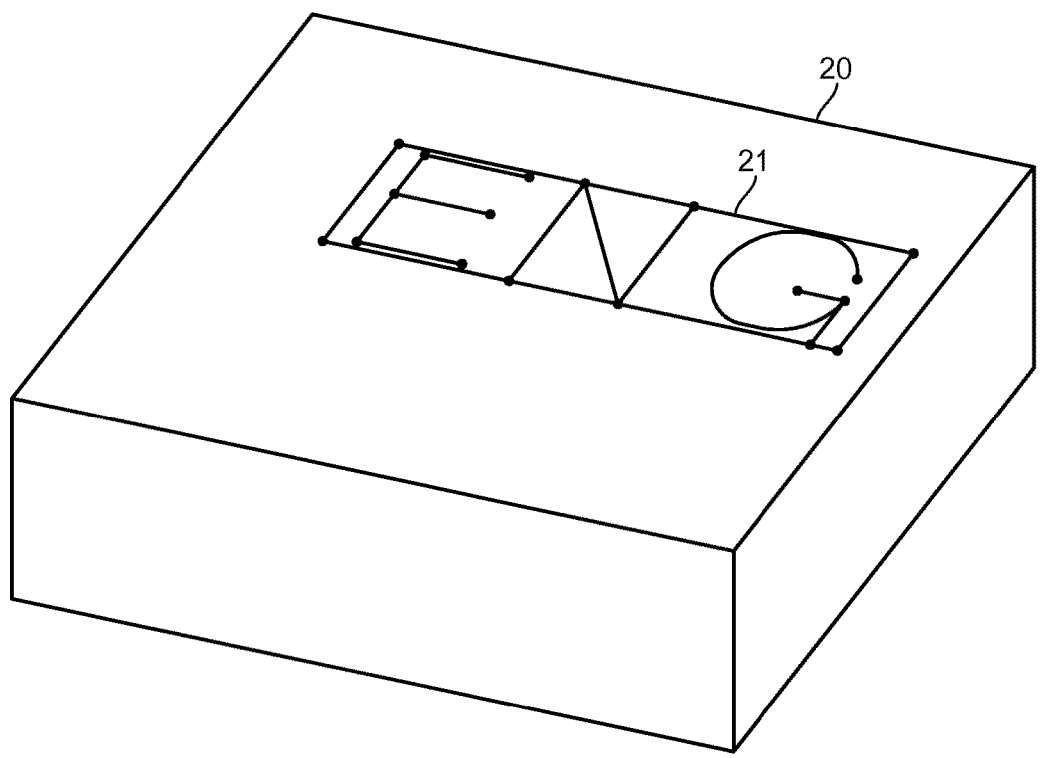
FIG. 6 is a diagram explaining a state in which the character string is arranged in a frame.
Figure 7:
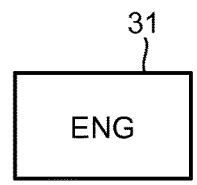
FIG. 7 is a diagram explaining data stored in a character-string storing unit.

Specifically, the interaction processing unit 2 displays a material shape on the display unit 8. FIG. 4 is a diagram of a display example of the material shape. As shown in the figure, a perspective view of a rectangular parallelepiped material shape 20 is displayed on the display unit 8. In this state, the operator can perform, by operating the input unit 9, an input for designating a surface and a range on the material shape 20 on which a character string is engraved. FIG. 5 is a diagram explaining a state in which the surface and the range on and in which the character string is engraved are designated. As shown in the figure, a frame 21 is displayed on one surface on the material shape 20. The frame 21 indicates a range in which the character string is engraved. Subsequently, the operator can input a character string to be engraved in the frame 21 by operating the input unit 9. FIG. 6 is a diagram explaining a state in which the character string is arranged in the frame 21. As shown in the figure, a character string "ENG" input by the operator is displayed in the frame 21. When the character string "ENG" is input, the interaction processing unit 2 can automatically calculate the positions of the characters forming the character string "ENG" such that the character string "ENG" is fit within the frame 21. The interaction processing unit 2 arranges "E", "N", and "G" at the respective calculated positions. The interaction processing unit 2 stores the input character string "EGN" in the character-string storing unit 3. FIG. 7 is a diagram explaining data stored in the character-string storing unit 3. As shown in the figure, the character string "ENG" is described in character data 31.

The interaction processing unit 2 stores character setting data related to the character string "ENG" in the character-setting-data storing unit 4. FIG. 8 is a diagram explaining a data configuration example of the character setting data. As shown in the figure, character setting data 41 includes fields in which a font, a style, a point, a position vector and a normal vector on a plane, the position of a character, and the direction of a character are stored. According to this example, in the font, a stroke font for storing the shape of a character as vector data of a curved line of a center line is designated. The style defines a form of a character, and it is possible to designate an Italic type, an oblique type, and the like of a typeface and a character that are obtained by slightly slanting a standard type to the right direction with respect to the standard type. In this embodiment, the standard type is designated. The point represents the size of a character, the width of a margin, and the length of a character. The position vector on a plane is coordinate values representing, on the program coordinate, the origin position of the plane on which character engraving is performed. The normal vector on a plane is a vector value representing, on the program coordinate, a normal vector of the plane on which character engraving is performed. The position of a character is coordinate values from the origin of the plane on which the character engraving is performed. The direction of a character represents a direction vector in which the character is arranged when the character engraving is performed. The interaction processing unit 2 can calculate the position of the character and the direction of the character from the input position information on the frame 21 and register the calculated information in the character setting data 41. The interaction processing unit 2 can calculate the point and the position of the character from the automatically-calculated positions of the characters forming the character string "ENG" and register the calculated information in the character setting data 41. The interaction processing unit 2 can display an indication for prompting the operator to input designation of the font and the style on the display unit 8 and cause the operator to input the designation of the font and the style.

After the processing at step S101, the interaction processing unit 2 receives an input of character engraving data from the operator (step S102).

Specifically, the operator operates the input unit 9, selects a tool for carrying out the character engraving out of the tools registered in the tool data 11, and sets cutting conditions. The cutting conditions include machining allowance in the Z-axis direction, the circumferential speed, which is the speed of the outer circumference of the tool, and the tool feed, which is the distance the tool cuts while rotating once. Then, the interaction processing unit 2 records the input these pieces of information in the character engraving data and stores the character engraving data in the character-engraving-data storing unit 5. FIG. 9 is a diagram explaining a data configuration example of the character engraving data. As shown in the figure, in character engraving data 51, a tool in use, Z-axis direction machining allowance, the circumferential speed, and the tool feed are described.

Subsequently, the character-engraving-tool-route generating unit 6 calculates, for each of the characters, line segments forming the character on the basis of the character data 31 stored in the character-string storing unit 3, and the font in use, the style, the point, the position vector on the plane, the normal vector on the plane, the position of the character, and the direction of the character described in the character setting data 41 stored in the character-setting-data storing unit 4 (step S103).

The character-engraving-tool-route generating unit 6 calculates the line segments, for example, as explained below. The character-engraving-tool-route generating unit 6 describes a line segment corresponding to a straight line portion of the character according to the following Formula (1) using a parameter t:

$$R(t)=P+tD \qquad (1)$$

where, P indicates a position vector on a straight line and D indicates a direction vector of the straight line. The value of t in Formula (1) is limited to a range of a value corresponding to the start point of the target straight line portion to a value corresponding to the end point of the target straight line portion.

The character-engraving-tool-route generating unit 6 describes a line segment corresponding to a curved line portion of the character according to the following Formula (2):

$$R(t)=C+rX\cos(t)+rY\sin(t) \qquad (2)$$

where, C indicates the center of a circle, r indicates the radius of the circle, and X and Y indicate axis direction vectors on the surface of the circle. The value of t in Formula (2) is limited to a range of a value corresponding to the start point of the target curved line portion to a value corresponding to the end point of the target curved line portion.

Figure 10:
FIG. 10 is a diagram of the shape of a character "E".
Figure 11:
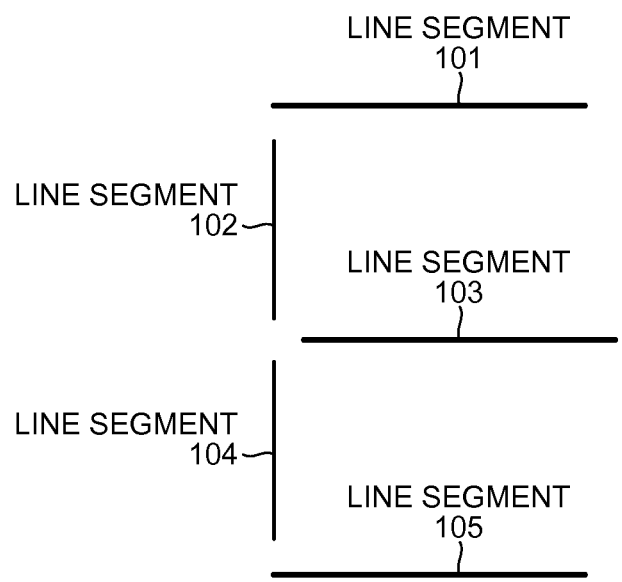
FIG. 11 is a diagram of line segments forming the character "E".

Subsequently, the character-engraving-tool-route generating unit 6 calculates intersections of the line segment for each of the characters and divide the line segment of each of the characters at the positions of the intersections (step S104). At this step, for example, the character-engraving-tool-route generating unit 6 divides the character "E" shown in FIG. 10 at the intersection positions to generate line segments 101 to 105 shown in FIG. 11.

Figures 12, 13:
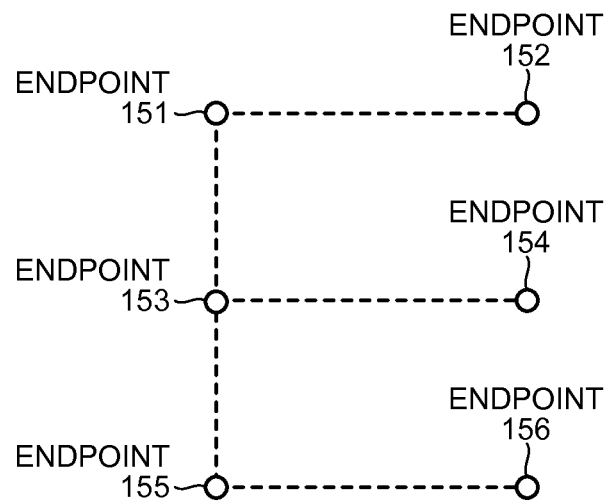
FIG. 12 is a diagram of endpoints forming the character "E".
FIG. 13 is a diagram of a data configuration example of classification data.

Subsequently, the character-engraving-tool-route generating unit 6 classifies, for each of the characters, the endpoints of the line segments into a connection endpoint, which is an endpoint connected to only one line segment, and a crossing endpoint, which is an endpoint connected to two or more line segments (step S105). For example, as shown in FIG. 12, the character "E" divided into the line segments 101 to 105 includes endpoints 151 to 156. Each of the endpoints 151, 153, and 155 is connected to two or three line segments. Therefore, the endpoints 151, 153, and 155 are classified as the crossing endpoint. Each of the endpoints 152, 154, and 156 is connected to one line segment. Therefore, the endpoints 152, 154, and 156 are classified as the connection endpoint. The classification result is recorded in the classification data 12. FIG. 13 is a diagram of a data configuration example of the classification data 12. As shown in the figure, in the classification data 12, for each of the endpoints forming the character "E", it is described whether the endpoint is the crossing endpoint or the connection endpoint.

Subsequently, the character-engraving-tool-route generating unit 6 sets the connection endpoint at the position closest to the origin as a start point (step S106). Step S106 is executed for one character in a character string described in the frame 21. For example, the start point is selected from the character "E" located on the leftmost in the character string "ENG". The upper right of the character is set as the origin. The endpoint 152 closest to the origin among the endpoints included in the character "E" is set as the start point.

The character-engraving-tool-route generating unit 6 executes processing (route setting processing) for setting a line segment connecting endpoints as a tool route (step S107). Every time the character-engraving-tool-route generating unit 6 executes the route setting processing, the character-engraving-tool-route generating unit 6 sets whether the tool route is a tool route reaching another endpoint from the endpoint to which the operator is paying attention (endpoint of interest) or a tool route returning from the endpoint of interest to the endpoint of interest through another endpoint. Note that the setting of the tool route means an operation for recording the tool route in the tool route information 14. When the tool route from the endpoint of interest to another endpoint is set, the character-engraving-tool-route generating unit 6 sets the other endpoint as a new endpoint of interest. Note that it is assumed that a plurality of endpoints are not simultaneously set as endpoints of interest. The character-engraving-tool-route generating unit 6 sets, as a first endpoint of interest, the start point determined by the processing at step S107.

Every time the character-engraving-tool-route generating unit 6 executes the route setting processing, the character-engraving-tool-route generating unit 6 determines whether a line segment not set as a tool route yet is connected to the endpoint of interest (step S108). When a line segment not set as a tool route yet is connected to the endpoint of interest (Yes at step S108), the character-engraving-tool-route generating unit 6 executes the processing at step S107 again. That is, the character-engraving-tool-route generating unit 6 sets a tool route such that the line segment connected to the endpoint of interest and not set as a tool route yet is set as a tool route.

Note that, every time the character-engraving-tool-route generating unit 6 executes the route setting processing, the character-engraving-tool-route generating unit 6 updates the classification data 12. Specifically, the character-engraving-tool-route generating unit 6 classifies again, on the basis of the number of line segments not set as a tool route among the line segments connected to the endpoint, whether the endpoint is the connection endpoint or the crossing endpoint. Note that, when all the line segments connected to the endpoint are set as a tool route, the endpoint changes to an endpoint connected to no line segment. The character-engraving-tool-route generating unit 6 classifies the endpoint connected to no line segment as an independent endpoint.

Figure 14:
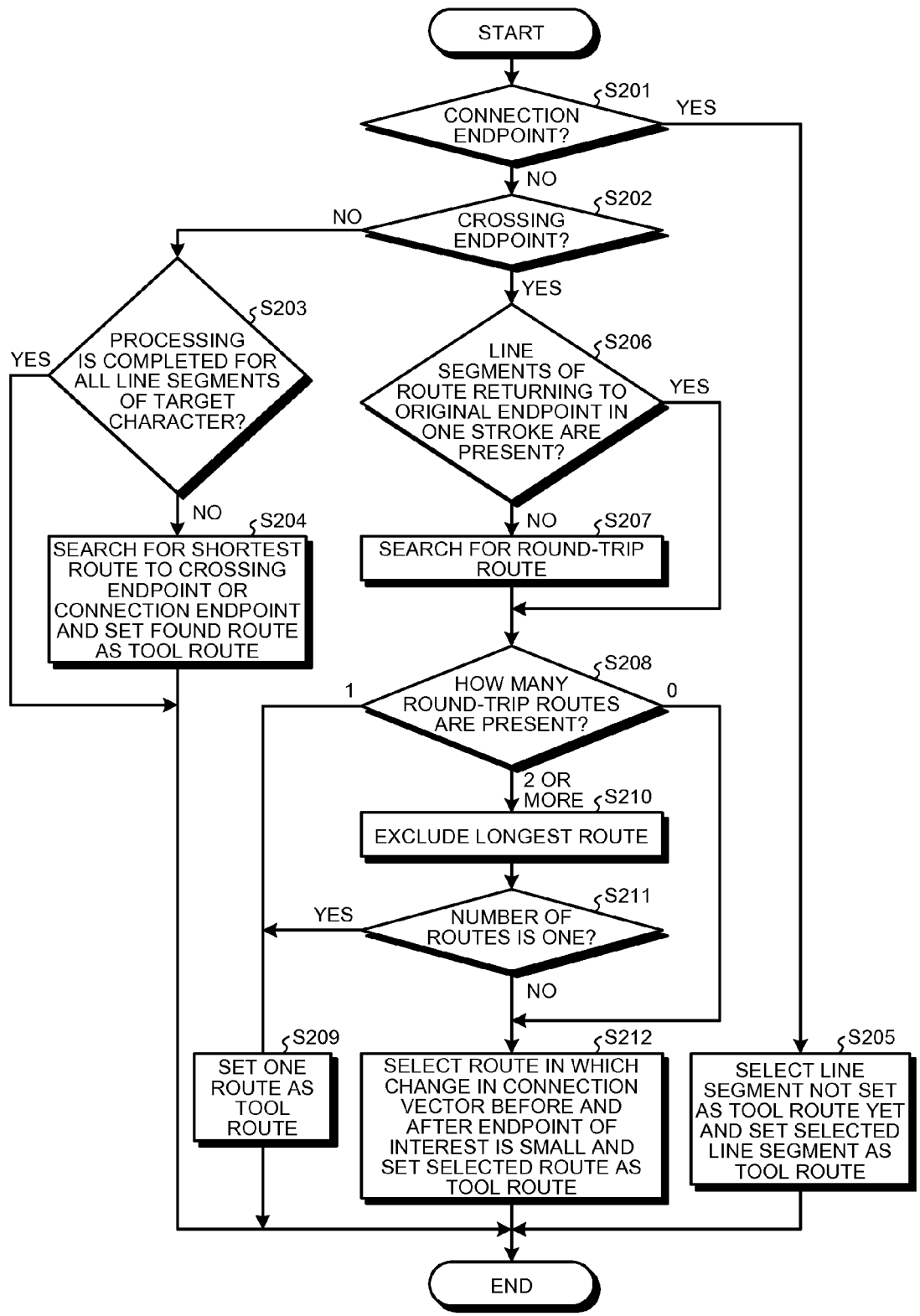
FIG. 14 is a flowchart explaining route setting processing.

FIG. 14 is a flowchart explaining the route setting processing more in detail.

As shown in FIG. 14, first, the character-engraving-tool-route generating unit 6 determines whether the endpoint of interest is the connection endpoint (step S201). When the endpoint of interest is not the connection endpoint (No at step S201), the character-engraving-tool-route generating unit 6 determines whether the endpoint of interest is the crossing endpoint (step S202). When the endpoint of interest is not the crossing endpoint (No at step S202), that is, the endpoint of interest is the independent endpoint, the character-engraving-tool-route generating unit 6 determines whether the route setting processing is completed for all the line segments forming the target character (step S203). It is possible to determine whether the route setting processing is completed for all the line segments forming the target character by, for example, determining whether all the endpoints included in the character have changed to independent endpoints.

When a line segment not set as a tool route is present (No at step S203), the character-engraving-tool-route generating unit 6 searches for a route from the present endpoint of interest to a crossing endpoint or a connection endpoint located at the shortest distance from the present endpoint of interest and sets the route found by the search as a tool route (step S204).

When the route setting processing is completed for all the line segments forming the target character (Yes at step S203) or after the processing at step S204, the character-engraving-tool-route generating unit 6 ends the route setting processing.

When the endpoint of interest is the connection endpoint (Yes at step S201), the character-engraving-tool-route generating unit 6 selects, as a tool route, a line segment not set as a tool route among the line segments connected to the connection endpoint (step S205) and ends the route setting processing. Note that the character-engraving-tool-route generating unit 6 sets, as a new endpoint of interest, the endpoint connected to the endpoint of interest by the line segment selected at step S205.

When it is possible to form a route returning to the endpoint of interest from the endpoint of interest through another endpoint, which is a route in which the same line segment is not reused and the same endpoint is not reused, (hereinafter, one-stroke route), the character-engraving-tool-route generating unit 6 sets the one-stroke route as a tool route. When the endpoint of interest is connected to another connection endpoint via only one or more crossing endpoints to which two line segments are connected or via no endpoint, the character-engraving-tool-route generating unit 6 sets, as a tool route, a route returning from the endpoint of interest to the endpoint of interest via the other connection endpoint (hereinafter, round-trip route). That is, when the endpoint of interest is the crossing endpoint, the route to be set as a tool route starting from the endpoint of interest corresponds to any of the one-stroke route, the round-trip route, and a route of one way (a one-way route) between the endpoint of interest and another crossing endpoint not included in the one-stroke route.

When the endpoint of interest is the crossing endpoint (Yes at step S202), the character-engraving-tool-route generating unit 6 determines whether a one-stroke route starting from and ending at the endpoint of interest is present (step S206). Note that, when the character-engraving-tool-route generating unit 6 searches for a one-stroke route, if a plurality of one-stroke routes are found, the character-engraving-tool-route generating unit 6 temporarily stores only the shortest route among the one-stroke routes. If a plurality of shortest one-stroke routes are present, the character-engraving-tool-route generating unit 6 temporarily stores the one-stroke routes.

When a one-stroke route is not present (No at step S206), the character-engraving-tool-route generating unit 6 searches for a round-trip route starting from and ending at the endpoint of interest (step S207). The character-engraving-tool-route generating unit 6 temporarily stores a round-trip route found by the search. When a one-stroke route is present (Yes at step S206), the character-engraving-tool-route generating unit 6 skips the processing at step S207.

Subsequently, the character-engraving-tool-route generating unit 6 determines the number of round-trip routes selectable as a tool route starting from the endpoint of interest (step S208). When only one round-trip route selectable as a tool route is present (1 at step S208), the character-engraving-tool-route generating unit 6 sets the round-trip route as a tool route (step S209) and ends the route setting processing.

When a plurality of round-trip routes selectable as a tool route are present in the determination processing at step S208 (2 or more at step S208), the character-engraving-tool-route generating unit 6 excludes the longest round-trip route from the routes selectable as a tool route (step S210). However, in this processing, when a plurality of longest routes having the same length are present, the character-engraving-tool-route generating unit 6 does not exclude the routes. Subsequently, the character-engraving-tool-route generating unit 6 determines whether only one route (a round-trip route or a one-stroke route) selectable as a tool route is present (step S211). When only one route selectable as a tool route is present (Yes at step S211), the character-engraving-tool-route generating unit 6 executes the processing at step S209.

When a round-trip route selectable as a tool route is not present (0 at step S208) or when a plurality of routes selectable as a tool route are present (No at step S211), the character-engraving-tool-route generating unit 6 selects, as a tool route, a route (a round-trip route or a one-stroke route) in which a change in a tangent vector of the tool routes before and after the endpoint of interest is the smallest (step S212) and ends the route setting processing. Note that, when a plurality of routes having the smallest change in the tangent vector are present at step S212, the character-engraving-tool-route generating unit 6 selects, as a tool route, a route located on the right side with respect to the direction of the tangent vector immediately before the endpoint of interest among the routes.

Here the description refers back to FIG. 3. When a line segment not set as a tool route yet is not connected to the endpoint of interest (No at step S108), that is, when the endpoint of interest is the independent endpoint, the character-engraving-tool-route generating unit 6 determines whether the setting of a tool route is completed for all the characters (step S109). When a character on which the setting of a tool route has not been performed is present (No at step S109), the character-engraving-tool-route generating unit 6 searches for, from the connection endpoints of all the characters on which the setting of a tool route has not been performed, a connection endpoint located at the closest position in a linear distance from the end point of the preceding character and sets the obtained connection endpoint as a new start point (step S110). Note that a linear distance d between an endpoint (X1, Y1, Z1) and an endpoint (X2, Y2, Z2) can be calculated by the following Formula (3):

$$d = \text{sqrt}\{(X1-X2)^2 + (Y1-Y2)^2 + (Z1-Z2)^2\} \quad (3)$$

After the processing at step S110, the character-engraving-tool-route generating unit 6 executes the processing at step S107 again.

When the setting of a tool route is completed for all the characters (Yes at step S109), the NC-machining-program-creation processing unit 7 creates the NC machining program 13 on the basis of the tool route information 14 and outputs the created NC machining program 13 (step S111). The machining program creating apparatus 1 ends the operation.

As explained above, the character-engraving-tool-route generating unit 6 can set a tool route by sequentially executing the processing for setting the end point of the set tool route as an endpoint of interest and setting a line segment connected to the endpoint of interest as the next tool route. When a line segment not set as a tool route yet is present among the line segments connected to the endpoint of interest, that is, when the endpoint of interest is the connection endpoint or the crossing endpoint, the character-engraving-tool-route generating unit 6 sets the line segment not set as a tool route as the next tool route. When a line segment not set as a tool route yet is not present among the line segments connected to the endpoint of interest, that is, when the endpoint of interest is the independent endpoint, the character-engraving-tool-route generating unit 6 sets the line segments that are already set as a tool route as a tool route again between the endpoint of interest and an endpoint forming a line segment not set as a tool route yet. The NC-machining-program-creation processing unit 7 creates the NC machining program 13 for moving the tool along the set tool route in the order set by the character-engraving-tool-route generating unit 6.

Consequently, it is possible to move the tool from the independent endpoint to the connection endpoint or the crossing endpoint without performing the tool approach in the Z-axis direction. Therefore, the NC-machining-program-creation processing unit 7 can create the NC machining program 13 that reduces a machining time as much as possible.

Note that the character-engraving-tool-route generating unit 6 regards the line segment connected from the endpoint of interest to the connection endpoint as a round-trip route and sets the round-trip route as a tool route through one route setting processing. However, the character-engraving-tool-route generating unit 6 can regard a forward route of the round-trip route as a one-way route. In such a case, an endpoint of interest after the forward route is set as a tool route is the independent endpoint. Therefore, the character-engraving-tool-route generating unit 6 can set a line segment that is already set as a tool route and is the same as the forward route as a tool route again.

A state in which the tool route information 14 is generated by repeating the route setting processing is specifically explained with reference to characters "E", "N", "G", and "kuruma in Chinese character" as an example.

First, the operation of the character-engraving-tool-route generating unit 6 in generating the tool route information 14 of the character "E" is explained. Note that, according to the processing at step S106, among the endpoints 151 to 156 forming the character "E", the endpoint 152 is set as a start point. That is, the endpoint 152 is a first endpoint of interest.

In the initial state, that is, in a state in which the route setting processing has not been performed at all for the character "E", the line segment 101, which is the only connection to the endpoint 152, is not selected as a route yet; therefore, the character-engraving-tool-route generating unit 6 sets the line segment 101 as a tool route according to the processing at step S205. That is, the character-engraving-tool-route generating unit 6 records "endpoint 152→endpoint 151" in the tool route information 14 related to the character "E".

The endpoint 151 set as a new endpoint of interest is originally a crossing endpoint to which the line segment 101 and the line segment 102 are connected. However, because the line segment 101 is set as a tool route, the endpoint 151 is regarded as a connection endpoint connected to only the line segment 102 (Yes at step S201). Therefore, the character-engraving-tool-route generating unit 6 sets the line segment 102 as a tool route according to the processing at step S205. That is, the character-engraving-tool-route generating unit 6 adds "endpoint 151→endpoint 153" to the tool route information 14 related to the character "E".

Subsequently, the endpoint 153 set as a new endpoint of interest is regarded as a crossing endpoint connected to the line segment 103 and the line segment 104 not set as a tool route (No at step S201 and Yes at step S202). A one-stroke route starting from the endpoint 153 is not present (No at step S206). Therefore, the character-engraving-tool-route generating unit 6 recognizes, according to the search for a round-trip route (step S207), a round-trip route "endpoint 153→endpoint 154→endpoint 153" and a round-trip route "endpoint 153→endpoint 155→endpoint 156→endpoint 155→endpoint 153". The two round-trip routes that can be set as a tool route are present as explained above (2 or more at step S208), the character-engraving-tool-route generating unit 6 excludes the longer route "endpoint 153→endpoint 155→endpoint 156→endpoint 155→endpoint 153" (step S210). The remaining route is only the route "endpoint 153→endpoint 154→endpoint 153" (Yes at step S211). Therefore, the character-engraving-tool-route generating unit 6 sets the remaining route as a tool route (step S209). That is, the character-engraving-tool-route generating unit 6 adds "endpoint 153→endpoint 154→endpoint 153" to the tool route information 14 related to the character "E".

The endpoint 153 set as the endpoint of interest again is regarded as a connection endpoint connected to only the line segment 104 because the line segment 103 is additionally set as a tool route (Yes at step S201). Therefore, the character-engraving-tool-route generating unit 6 sets the line segment 104 as a tool route according to the processing at step S205. That is, the character-engraving-tool-route generating unit 6 adds "endpoint 153→endpoint 155" to the tool route information 14 related to the character "E".

The endpoint 155 set as a new endpoint of interest is originally a crossing endpoint to which the line segment 104 and the line segment 105 are connected. However, the endpoint 155 is regarded as a connection endpoint connected to only the line segment 105 because the line segment 104 is set as a tool route (Yes at step S201). Therefore, the character-engraving-tool-route generating unit 6 sets the line segment 105 as a tool route according to the processing at step S205. That is, the character-engraving-tool-route generating unit 6 adds "endpoint 155→endpoint 156" to the tool route information 14 related to the character "E".

The endpoint 156 set as a new endpoint of interest is regarded as an independent endpoint (No at step S201 and No at step S202). All the line segments forming the character "E" are already set as a tool route (Yes at step S203). Therefore, the character-engraving-tool-route generating unit 6 ends the route setting processing related to the character "E".

Figures 15, 16:
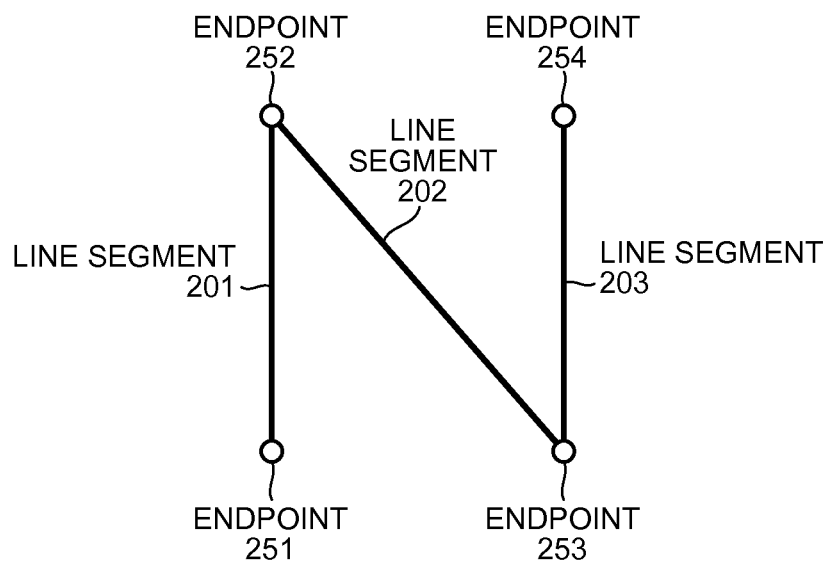
FIG. 15 is a diagram of a data configuration example of tool route information related to the character "E".
FIG. 16 is a diagram of line segments and endpoints forming a character "N".

FIG. 15 is a diagram of a data configuration example of the tool route information 14 related to the character "E" completed by the operation explained above. As shown in the figure, in the tool route information 14, a plurality of tool routes are registered with route numbers give in the order of setting.

Subsequently, because the route setting processing related to the characters "N" and "G" is not completed (No at step S109), the character-engraving-tool-route generating unit 6 sets a connection endpoint closest to the endpoint 156, which is set as an end point of the character "E", as a new start point according to the processing at step S110.

Specifically, the character "N" is located closer to the character "E" than the character "G". Therefore, one of the connection endpoints forming the character "N" is set as a start point. FIG. 16 is a diagram of line segments and endpoints forming the character "N". FIG. 17 is a diagram of the initial state of classification data related to the character "N". The character "N" is formed by line segments 201 to 203 and endpoints 251 to 254. In the initial state, the endpoints 251 and 254 are classified as the connection endpoint and the endpoints 252 and 253 are classified as the crossing endpoint. The character-engraving-tool-route generating unit 6 sets the endpoint 251, which is a connection endpoint closest to the endpoint 156, as a start point according to the processing at step S110.

The endpoint 251 set as the start point is a connection endpoint connected to only the line segment 201 (Yes at step S201). Therefore, the character-engraving-tool-route generating unit 6 sets the line segment 201 as a tool route according to the processing at step S205. That is, the character-engraving-tool-route generating unit 6 records "endpoint 251→endpoint 252" in the tool route information 14 related to the character "N".

The endpoint 252 set as a new endpoint of interest is regarded as a connection endpoint connected to only the line segment 202 (Yes at step S201). Therefore, the character-engraving-tool-route generating unit 6 sets the line segment 202 as a tool route according to the processing at step S205. That is, the character-engraving-tool-route generating unit 6 adds "endpoint 252→endpoint 253" to the tool route information 14 related to the character "N".

The endpoint 253 set as a new endpoint of interest is regarded as a connection endpoint connected to only the line segment 203 (Yes at step S201). Therefore, the character-engraving-tool-route generating unit 6 sets the line segment 203 as a tool route according to the processing at step S205. That is, the character-engraving-tool-route generating unit 6 adds "endpoint 253→endpoint 254" to the tool route information 14 related to the character "N".

The endpoint 254 set as a new endpoint of interest is regarded as an independent endpoint (No at step S201 and No at step S202). All the line segments forming the character "N" are already set as a tool route (Yes at step S203). Therefore, the character-engraving-tool-route generating unit 6 ends the route setting processing related to the character "N". FIG. 18 is a diagram of a data configuration example of the tool route information 14 related to the character "N" completed by the operation explained above.

Subsequently, because the route setting processing related to the character "G" is not completed (No at step S109), the character-engraving-tool-route generating unit 6 sets a connection endpoint closest to the endpoint 254, which is set as an end point of the character "N", as a new start point according to the processing at step S110.

Figures 19, 20:
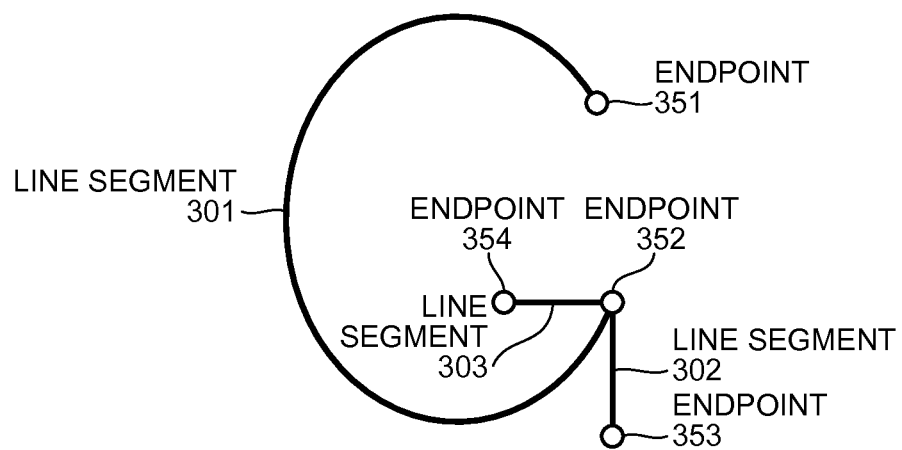
FIG. 19 is a diagram of line segments and endpoints forming a character "G".
FIG. 20 is a diagram of an initial state of classification data related to the character "G".

FIG. 19 is a diagram of line segments and endpoints forming the character "G". FIG. 20 is a diagram of the initial state of classification data related to the character "G". The character "G" is formed by line segments 301 to 303 and endpoints 351 to 354. In the initial state, the endpoints 351, 353, and 354 are classified as the connection endpoint and the endpoint 352 is classified as the crossing endpoint. The character-engraving-tool-route generating unit 6 sets the endpoint 351, which is a connection endpoint closest to the endpoint 254, as a start point according to the processing at step S110.

The endpoint 351 set as the start point is a connection endpoint connected to only the line segment 301 (Yes at step S201). Therefore, the character-engraving-tool-route generating unit 6 sets the line segment 301 as a tool route according to the processing at step S205. That is, the character-engraving-tool-route generating unit 6 records "endpoint 351→endpoint 352" in the tool route information 14 related to the character "G".

The endpoint 352 set as a new endpoint of interest is connected to the line segment 302 and the line segment 303 not set as a tool route yet besides the line segment 301 already set as a tool route. Therefore, the endpoint 352 is regarded as a crossing endpoint (No at step S201 and Yes at step S202). A one-stroke route starting from the endpoint 352 is not present (No at step S206). Therefore, the character-engraving-tool-route generating unit 6 recognizes, according to the search for a round-trip route (step S207), a round-trip route "endpoint 352→endpoint 353→endpoint 352" and a round-trip route "endpoint 352→endpoint 354→endpoint 352". Among the round-trip routes, when the longest route "endpoint 352→endpoint 353→endpoint 352" is excluded (step S210), one route remains (Yes at step S211). Therefore, the character-engraving-tool-route generating unit 6 sets "endpoint 352→endpoint 354→endpoint 352" as a tool route according to the processing at step S209. That is, the character-engraving-tool-route generating unit 6 adds "endpoint 352→endpoint 354→endpoint 352" to the tool route information 14 related to the character "G".

The endpoint 352 set as the endpoint of interest again is regarded as a connection endpoint connected to only the line segment 302 (Yes at step S201). Therefore, the character-engraving-tool-route generating unit 6 sets the line segment 302 as a tool route according to the processing at step S205. That is, the character-engraving-tool-route generating unit 6 adds "endpoint 352→endpoint 353" to the tool route information 14 related to the character "G".

Figures 21, 22:
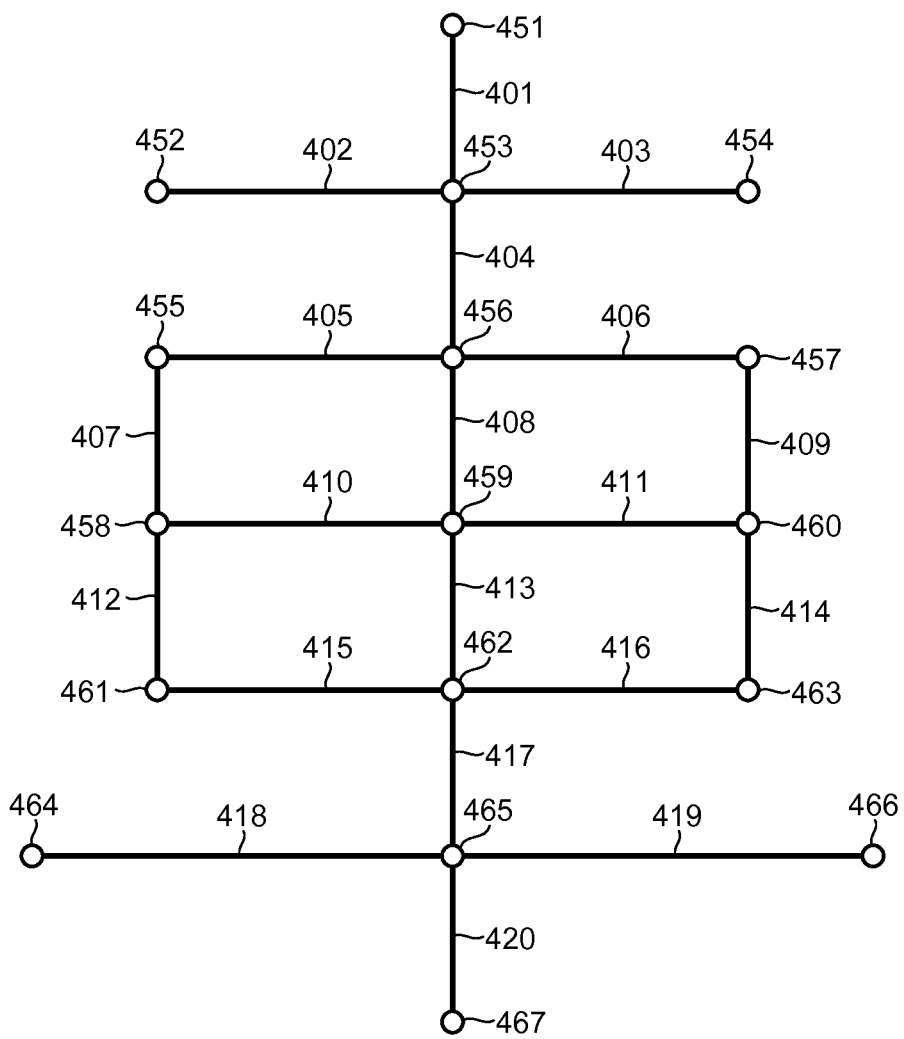
FIG. 21 is a diagram of a data configuration example of tool route information related to the character "G".
FIG. 22 is a diagram of line segments and endpoints forming a character "kuruma in a Chinese character".

The endpoint 353 set as the endpoint of interest again is regarded as an independent endpoint (No at step S201 and No at step S202). All the line segments forming the character "G" are already set as a tool route (Yes at step S203). Therefore, the character-engraving-tool-route generating unit 6 ends the route setting processing related to the character "G". FIG. 21 is a diagram of a data configuration example of the tool route information 14 related to the character "G" completed by the operation explained above.

The character-engraving-tool-route generating unit 6 sends the tool route information 14 related to the characters "E", "N", and "G" to the NC-machining-program-creation processing unit 7 in this order.

The operation of the character-engraving-tool-route generating unit 6 in generating the tool route information 14 related to the character "kuruma in Chinese character" is explained. FIG. 22 is a diagram of line segments and endpoints forming the character "kuruma in Chinese character". FIG. 23 is a diagram of the initial state of classification data related to the character "kuruma in Chinese character". The character "kuruma in Chinese character" is formed by line segments 401 to 420 and endpoints 451 to 467. In the initial state, the endpoints 451, 452, 454, 464, 466, and 467 are classified as the connection endpoint and the endpoints 453, 455 to 463, and 465 are classified as the crossing endpoint.

In the processing at step S106, the character-engraving-tool-route generating unit 6 selects, with the upper left of the character "kuruma in Chinese character" as an origin, the endpoint 452, which is a connection endpoint closest to the origin, as a start point. The endpoint 452 is regarded as a connection endpoint because the line segment 402 connected to the endpoint 452 is not set as a tool route (Yes at step S201). Therefore, the character-engraving-tool-route generating unit 6 sets the line segment 402 as a tool route according to the processing at step S205. That is, the character-engraving-tool-route generating unit 6 records "endpoint 452→endpoint 453" in the tool route information 14 related to the character "kuruma in Chinese character".

The endpoint 453 set as a new endpoint of interest is connected to the line segment 401, the line segment 403, and the line segment 404 not set as a tool route. Therefore, the endpoint 453 is regarded as a crossing endpoint (No at step S201 and Yes at step S202). Because a one-stroke route starting from the endpoint 453 is not present (No at step S206), the character-engraving-tool-route generating unit 6 recognizes, according to the search for a round-trip route (step S207), a round-trip route "endpoint 453→endpoint 451→endpoint 453" and a round-trip route "endpoint 453→endpoint 454→endpoint 453". In the line segment 404 connected to the endpoint 453, the endpoint 456 is connected to the line segment 404, the line segment 405, the line segment 406, and the line segment 408. That is, the endpoint 453 is a crossing endpoint to which three or more line segments are connected. Therefore, the character-engraving-tool-route generating unit 6 recognizes the line segment 404 as a one-way route. The two round-trip routes that can be set as a tool route are present as explained above (2 or more at step S208). The character-engraving-tool-route generating unit 6 excludes the round-trip route of the line segment 403 "endpoint 453→endpoint 454→endpoint 453", which is the longest route, from the two round-trip routes (step S210). Then, only the line segment 401 remains (Yes at step S211); therefore, the character-engraving-tool-route generating unit 6 sets the line segment 401 as a tool route (step S209). That is, the character-engraving-tool-route generating unit 6 adds "endpoint 453→endpoint 451→endpoint 453" to the tool route information 14 related to the character "kuruma in Chinese character".

The endpoint 453 set as the endpoint of interest again is regarded as a crossing endpoint because the endpoint 453 is connected to the line segment 403 and the line segment 404 not set as a tool route (No at step S201 and Yes at step S202). Because a one-stroke route starting from the endpoint 453 is not present (No at step S206), the character-engraving-tool-route generating unit 6 recognizes, according to the search for a round-trip route (step S207), a round-trip route "endpoint 453→endpoint 454→endpoint 453". A one-way route of the line segment 404 is not set as a tool route yet. A round-trip route that can be set as a tool route is only the round trip route "endpoint 453→endpoint 454→endpoint 453" (1 at step S208). Therefore, the character-engraving-tool-route generating unit 6 sets the round-trip route "endpoint 453→endpoint 454→endpoint 453" as a tool route (step S209). That is, the character-engraving-tool-route generating unit 6 adds "endpoint 453→endpoint 454→endpoint 453" to the tool route information 14 related to the character "kuruma in Chinese character".

The endpoint 453 set as the endpoint of interest again is originally a crossing endpoint connected to the line segments 401 to 404. However, the endpoint 453 is regarded as a connection endpoint connected to only the line segment 404 because the line segments 401 to 403 are set as a tool route (Yes at step S201). Therefore, the character-engraving-tool-route generating unit 6 sets the line segment 404 as a tool route according to the processing at step S205. That is, the character-engraving-tool-route generating unit 6 adds "endpoint 453→endpoint 456" to the tool route information 14 related to the character "kuruma in Chinese characters".

The endpoint 456 set as a new endpoint of interest is regarded as a crossing endpoint because the endpoint 456 is connected to the line segment 405, the line segment 406, and the line segment 408 not set as a tool route (No at step S201 and Yes at step S202). As one-stroke routes staring from the endpoint 456, four routes described below are present (Yes at step S206).

Endpoint 456→endpoint 455→endpoint 458→endpoint 459→endpoint 456

Endpoint 456→endpoint 459→endpoint 458→endpoint 455→endpoint 456

Endpoint 456→endpoint 459→endpoint 460→endpoint 457→endpoint 456

Endpoint 456→endpoint 457→endpoint 460→endpoint 459→endpoint 456

Note that a route larger than the four one-stroke routes, such as "endpoint 456→endpoint 455→endpoint 458→endpoint 461→endpoint 462→endpoint 459→endpoint 456", can also be extracted as a one-stroke route. However, the character-engraving-tool-route generating unit 6 temporarily stores only the four routes described above, which pass through the minimum number of line segments, as the one-stroke routes.

The number of round-trip routes that can be set as a tool route is zero (0 at step S208). Therefore, the character-engraving-tool-route generating unit 6 sets a route "endpoint 456→endpoint 459→endpoint 458→endpoint 455→endpoint 456", which has a smallest change in a tangent vector and is a route on the right side with respect to the direction of the tangent vector, as a tool route (step S212). That is, the character-engraving-tool-route generating unit 6 adds "endpoint 456→endpoint 459→endpoint 458→endpoint 455→endpoint 456" to the tool route information 14 related to the character "kuruma in Chinese character".

The endpoint 456 set as the endpoint of interest again is regarded as a connection endpoint because a line segment not set as a tool route among the line segments connected to the endpoint 456 is only the line segment 406 (Yes at step S201). Therefore, the character-engraving-tool-route generating unit 6 sets the line segment 406 as a tool route according to the processing at step S205. That is, the character-engraving-tool-route generating unit 6 adds "endpoint 456→endpoint 457" to the tool route information 14 related to the character "kuruma in Chinese character".

The endpoint 457 set as a new endpoint of interest is regarded as a connection endpoint connected to only the line segment 409 (Yes at step S201). Therefore, the character-engraving-tool-route generating unit 6 sets the line segment 409 as a tool route according to the processing at step S205. That is, the character-engraving-tool-route generating unit 6 adds "endpoint 457→endpoint 460" to the tool route information 14 related to the character "kuruma in Chinese character".

The endpoint 460 set as a new endpoint of interest is regarded as a crossing endpoint connected to the line segment 411 and the line segment 414 (No at step S201 and Yes at step S202). As a one-stroke route starting from the endpoint 460, two routes described below are present (Yes at step S206).

Endpoint 460→endpoint 459→endpoint 462→endpoint 463→endpoint 460

Endpoint 460→endpoint 463→endpoint 462→endpoint 459→endpoint 460

However, the number of round-trip routes that can be set as a tool route is zero (0 at step S208). Therefore, the character-engraving-tool-route generating unit 6 sets a route "endpoint 460→endpoint 463→endpoint 462→endpoint 459→endpoint 460", which has a smallest change in a tangent vector in the two one-stroke routes, as a tool route (step S212). That is, the character-engraving-tool-route generating unit 6 adds "endpoint 460→endpoint 463→endpoint 462→endpoint 459→endpoint 460" to the tool route information 14 related to the character "kuruma in Chinese character".

The endpoint 460 set as the endpoint of interest again is regarded as an independent endpoint (No at step S201 and No at step S202). Concerning the character "kuruma in Chinese character", line segments not set as a tool route yet are present (No at step S203). Therefore, the character-engraving-tool-route generating unit 6 recognizes a route "endpoint 460 endpoint 459 endpoint 462" and a route "endpoint 460 endpoint 463 endpoint 462" as the shortest routes among the routes reaching any of other connection endpoint and crossing endpoint from the endpoint 460 (step S204). The character-engraving-tool-route generating unit 6 sets a route "endpoint 460 endpoint 463 endpoint 462", which is a route having a small change in a tangent vector, among these routes as a tool route. That is, the character-engraving-tool-route generating unit 6 adds "endpoint 460 endpoint 463 endpoint 462" to the tool route information 14 related to the character "kuruma in Chinese character".

The endpoint 462 set as a new endpoint of interest is regarded as a crossing endpoint to which the line segment 415 and the line segment 417 not set as a tool route are connected (No at step S201 and Yes at step S202). A one-stroke route starting from the endpoint 462 is not present (No at step S206). The character-engraving-tool-route generating unit 6 recognizes a round-trip route "endpoint 462→endpoint 461→endpoint 458→endpoint 461→endpoint 462" according to the search for a round-trip route (step S207). The endpoint 461 connected to the line segment 415 is a crossing endpoint to which two line segments, i.e., the line segment 412 and the line segment 415, are connected. The endpoint 465 connected to the line segment 417 is a crossing endpoint connected to the line segments 417 to 420 (i.e., connected to three or more line segments). Therefore, the line segment 417 is recognized as a one-way route. The number of round-trip routes that can be set as a tool route is one as explained above (1 at step S208). Therefore, the character-engraving-tool-route generating unit 6 sets the round-trip route as a tool route according to the processing at step S209. That is, the character-engraving-tool-route generating unit 6 adds "endpoint 462→endpoint 461→endpoint 458→endpoint 461→endpoint 462" to the tool route information 14 related to the character "kuruma in Chinese character".

The endpoint 462 set as the endpoint of interest again is regarded as a connection endpoint to which only the line segment 417 is connected (Yes at step S201). Therefore, the character-engraving-tool-route generating unit 6 sets the line segment 417 as a tool route according to the processing at step S205. That is, the character-engraving-tool-route generating unit 6 adds "endpoint 462→endpoint 465" to the tool route information 14 related to the character "kuruma in Chinese character".

The endpoint 465 set as a new endpoint of interest is regarded as a crossing endpoint because the line segments 418 to 420 not set as a tool route are connected to the endpoint 465 (No at step S201 and Yes at step S202). A one-stroke route starting from the endpoint 465 is not present (No at step S206). Therefore, the character-engraving-tool-route generating unit 6 recognizes three round-trip routes described below according to the search for a round-trip route (step S207).

Endpoint 465→endpoint 464→endpoint 465
Endpoint 465→endpoint 466→endpoint 465
Endpoint 465→endpoint 467→endpoint 465

The three routes that can be set as a tool route are present as explained above (2 or more, at step S208). Therefore, the character-engraving-tool-route generating unit 6 excludes the route "endpoint 465→endpoint 464→endpoint 465" and the route "endpoint 465→endpoint 466→endpoint 465", which are the longest routes, according to the processing at step S210. The remaining route is only one route "endpoint 465→endpoint 467→endpoint 465" (Yes at step S211). Therefore, the character-engraving-tool-route generating unit 6 sets the route "endpoint 465→endpoint 467→endpoint 465" as a tool route according to the processing at step S209. That is, the character-engraving-tool-route generating unit 6 adds "endpoint 465→endpoint 467→endpoint 465" to the tool route information 14 related to the character "kuruma in Chinese character".

The endpoint 465 set as the endpoint of interest again is regarded as a crossing endpoint because the line segment 418 and the line segment 419 not set as a tool route are connected to the endpoint 465 (No at step S201 and Yes at step S202). A one-stroke route starting from the endpoint 465 is not present (No at step S206). Therefore, the character-engraving-tool-route generating unit 6 recognizes two round-trip routes described below according to the search for a round-trip route (step S207).

Endpoint 465→endpoint 464→endpoint 465
Endpoint 465→endpoint 466→endpoint 465

The two routes that can be set as a tool route are present as explained above (2 or more, at step S208). Therefore, the character-engraving-tool-route generating unit 6 attempts to exclude the longest route in the processing at step S210. However, because the lengths of the two routes are equal to each other, the character-engraving-tool-route generating unit 6 does not exclude a route here. The number of remaining routes is two (No at step S211); therefore, the character-engraving-tool-route generating unit 6 sets, as a tool route, the route "endpoint 465→endpoint 466→endpoint 465" located on the right side in the direction of a tangent vector. That is, the character-engraving-tool-route generating unit 6 adds "endpoint 465→endpoint 466→endpoint 465" to the tool route information 14 related to the character "kuruma in Chinese character".

The endpoint 465 set as the endpoint of interest again is regarded as a connection endpoint to which the line segment 418 not set as a tool route is connected (Yes at step S201). Therefore, the character-engraving-tool-route generating unit 6 sets the line segment 418 as a tool route according to the processing at step S205. That is, the character-engraving-tool-route generating unit 6 adds "endpoint 465→endpoint 464" to the tool route information 14 related to the character "kuruma in Chinese character".

The endpoint 464 set as a new endpoint of interest is regarded as an independent endpoint (No at step S201 and No at step S202). All the line segments forming the character "kuruma in Chinese character" are already set as a tool route (Yes at step S203). Therefore, the character-engraving-tool-route generating unit 6 ends the route setting processing related to the character "kuruma in Chinese character". FIG. 24 is a diagram of a data configuration example of the tool route information 14 related to the character "kuruma in Chinese character" completed by the operation explained above.

As explained above, according to the first embodiment, the character-engraving-tool-route generating unit 6 generates a plurality of line segments by dividing the line segment forming a character that is a character engraving target at intersection positions of the character and sequentially executes processing for setting an end point of a set tool route as an endpoint of interest and setting a line segment connected to the endpoint of interest as the next tool route. The NC-machining-program-creation processing unit 7 creates the NC machining program 13 for moving the tool along the set tool route in the order set by the character-engraving-tool-route generating unit 6. When a line segment not set as a tool route yet is present among the line segments connected to the endpoint of interest, the character-engraving-tool-route generating unit 6 sets the line segment not set as a tool route as the next tool route. When a line segment not set as a tool route yet is not present among the line segments connected to the endpoint of interest, the character-engraving-tool-route generating unit 6 sets the line segments that are already set as a tool route as a tool route again between the endpoint of interest and an endpoint forming a line segment not set as a tool route yet. Consequently, the created NC machining program 13 can move the tool from the independent endpoint to the connection endpoint or the crossing endpoint without causing the tool to execute the tool approach in the Z-axis direction. Therefore, it is possible to create the NC machining program 13 that reduces a machining time as much as possible. That is, the machining program creating apparatus 1 can create the NC machining program 13 that executes character engraving in as short a machining time as possible.

Second Embodiment

According to a second embodiment, a machining program creating apparatus can create an NC machining program for, when another tool route overlapping with an already-machined tool route is set, increasing the tool feed speed of the other tool route.

Figure 25:
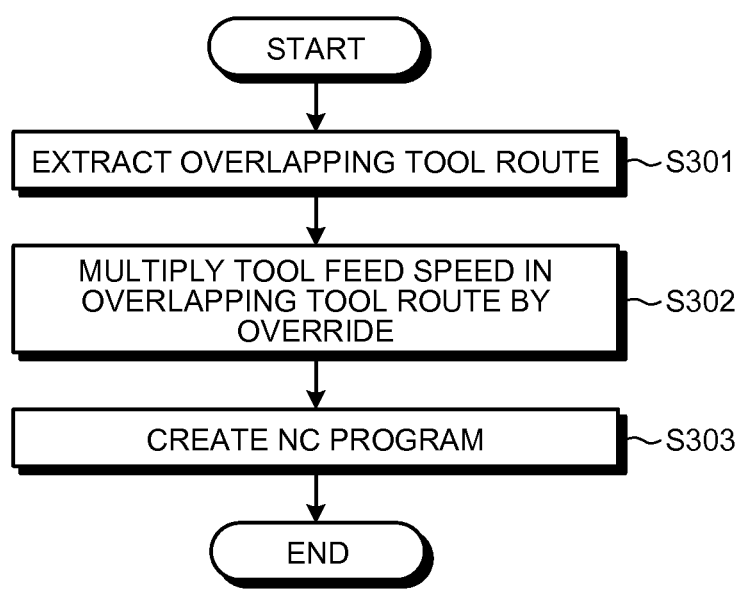
FIG. 25 is a flowchart explaining the operation of an NC-machining-program-creation processing unit in a second embodiment.

FIG. 25 is a flowchart explaining the operation of the NC-machining-program-creation processing unit 7 in the second embodiment.

As shown in the figure, the NC-machining-program-creation processing unit 7 extracts an overlapping tool route (a tool route later in machining order among a plurality of the same tool routes) by referring to the tool route information 14 input from the character-engraving-tool-route generating unit 6 (step S301). The NC-machining-program-creation processing unit 7 then multiplies the tool feed speed in the tool route later in the machining order among the overlapping tool routes by override (step S302), creates the NC machining program 13 (step S303), and ends the setting of the tool feed speed.

As explained above, according to the second embodiment, the NC-machining-program-creation processing unit 7 is configured to extract, from the tool routes set by the character-engraving-tool-route generating unit 6, the tool route later in the machining order among a plurality of the same tool routes and set the tool feed speed in the extracted tool route to the rapid feed speed. Therefore, when a section once machined is machined again, the NC machining program 13 can fast-feed the tool. Consequently, the machining program creating apparatus 1 in the second embodiment can create the NC machining program 13 that further reduces a machining time compared to the first embodiment.

Third Embodiment

According to the second embodiment, the tool on the overlapping tool route is fast-fed. However, when the machining time is further reduced by allowing the tool to escape in the Z-axis direction and skipping the overlapping tool route rather than fast-feeding the tool, the tool approach in the Z-axis direction can be performed.

Figure 26:
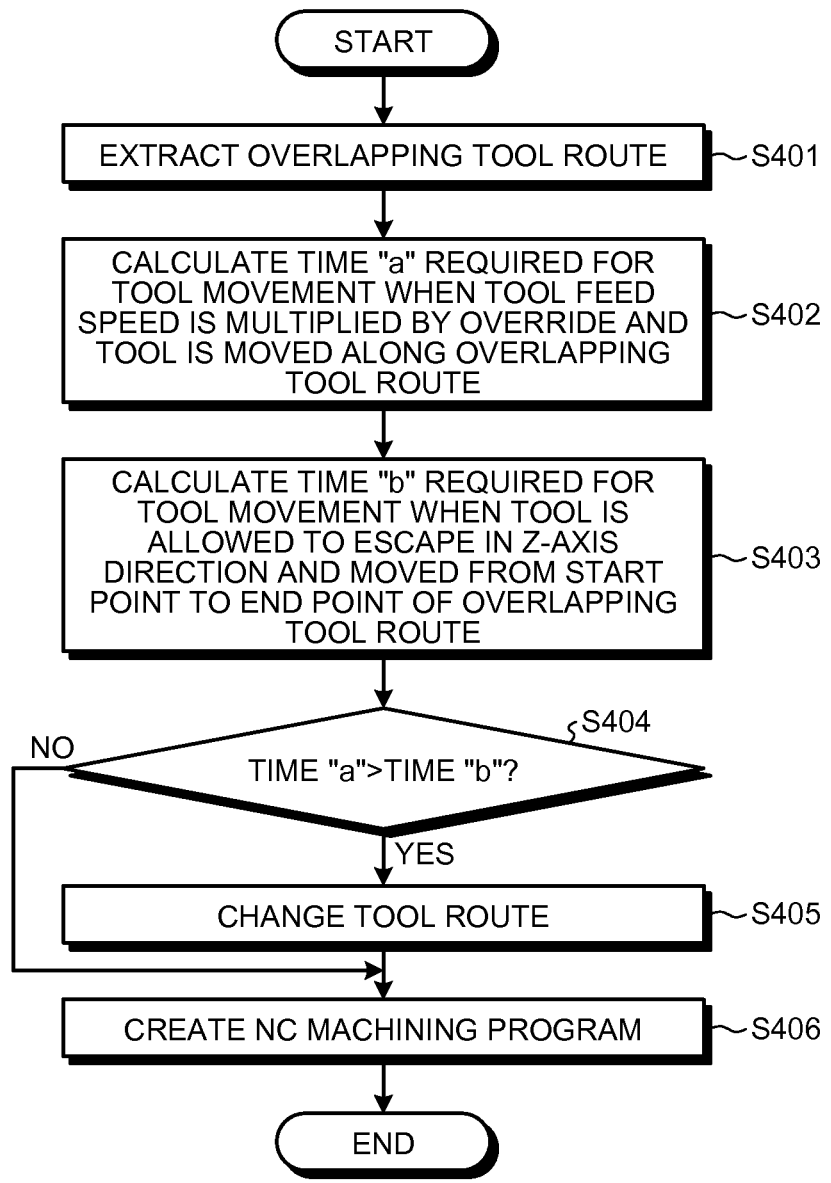
FIG. 26 is a flowchart explaining the operation of an NC-machining-program-creation processing unit in a third embodiment.

FIG. 26 is a flowchart explaining the operation of the NC-machining-program-creation processing unit 7 in a third embodiment.

As shown in the figure, the NC-machining-program-creation processing unit 7 extracts an overlapping tool route by referring to the tool route information 14 input from the character-engraving-tool-route generating unit 6 (step S401). The NC-machining-program-creation processing unit 7 then calculates time "a" required for tool movement when the tool feed speed in the overlapping tool route is multiplied by the override (step S402). For example, the NC-machining-program-creation processing unit 7 can calculate the time "a" by calculating the length of the tool route and dividing the calculated length by the tool feed speed multiplied by the override.

Subsequently, the NC-machining-program-creation processing unit 7 creates a tool route for allowing the tool to escape in the Z-axis direction (i.e., a tool route for moving the tool by fast-feed in the positive direction of the Z axis by a predetermined amount at the start point of the overlapping tool route), a tool route connected to the end point of the overlapping tool route by a straight line, and a tool route for causing the tool to approach in the Z-axis direction (i.e., a tool route for moving the tool by machining-feed in the negative direction of the Z axis to the end point of the overlapping tool route), and calculates time "b" required for the tool movement until the tool is caused to approach after being allowed to escape (step S403).

The NC-machining-program-creation processing unit 7 determines whether the time "a" is larger than the time "b" (step S404). When the time "a" is larger than the time "b" (Yes at step S404), the NC-machining-program-creation processing unit 7 changes the overlapping tool route and the tool feed speed in the tool route to the tool route and the tool feed speed generated at step S403 (step S405) and creates the NC machining program 13 (step S406). When the time "a" is smaller than the time "b" (No at step S404), the NC-machining-program-creation processing unit 7 skips the processing at step S405.

Note that, when a plurality of overlapping tool routes are present, the NC-machining-program-creation processing unit 7 desirably executes the processing at step S402 to step S405 concerning each of the overlapping tool routes.

As explained above, according to the third embodiment, the NC-machining-program-creation processing unit 7 is configured to create the NC machining program 13 such that tool routes later in the machining order among a plurality of the same tool routes are extracted from the tool routes set by the character-engraving-tool-route generating unit 6, concerning each of the extracted tool routes, the moving time in fast-feeding the tool in the extracted tool route is compared with the moving time in moving the tool in another tool route for allowing the tool to escape in the Z-axis direction at the start point of the extracted tool route and causing the tool to approach in the Z-axis direction at the end point, and, when the moving time required for the extracted tool route is longer than the moving time required for the other tool route, the extracted tool route is replaced by the other tool route, and the tool is moved along the replaced other tool route. Therefore, the machining program creating apparatus 1 in the third embodiment can create the NC machining program 13 that further reduces the machining time compared to the second embodiment.

INDUSTRIAL APPLICABILITY

As explained above, the machining program creating apparatus, the machining program creating method, and the machining program creating program according to the present invention are suitably applied to a machining program creating apparatus, a machining program creating method, and a machining program creating program for creating an NC machining program for causing a numerical control device to execute numerical control of a machine tool.

REFERENCE SIGNS LIST

1 Machining program creating apparatus
2 Interaction processing unit
3 Character-string storing unit
4 Character-setting-data storing unit
5 Character-engraving-data storing unit
6 Character-engraving-tool-route generating unit
7 NC-machining-program-creation processing unit
8 Display unit
9 Input unit
10 Font data
11 Tool data
12 Classification data
13 NC machining program
14 Tool route information
20 Material shape
21 Frame
31 Character data
41 Character setting data
51 Character engraving data
101 to 105, 201 to 203, 301 to 303, 401 to 420 Line segments
151 to 156, 251 to 254, 351 to 354, 451 to 467 Endpoints
1001 CPU
1002 RAM
1003 ROM
1004 Machining program creating program

The invention claimed is:

1. A machining program creating apparatus that creates a numerical control (NC) machining program for executing character engraving on a workpiece, the apparatus comprising:
a processor to execute a program; and
a memory to store the program which, when executed by the processor, performs processes of:
generating a plurality of line segments by dividing a line segment forming a character that is a character engraving target at an intersection position of the character and sequentially executing processing for setting an end point of a set tool route as a start point and setting a line segment connected to the start point as a next tool route; and
creating an NC machining program for moving a tool along the set tool route in an order set in the generating, wherein
the generating includes, when a line segment not set as a tool route yet is present among line segments connected to the start point, searching for a route configured by only line segments that include the line segment and are not set as a tool route yet and setting the route found by the search as a next tool route, and, when a line segment not set as a tool route yet is not present, setting a line segment that is already set as a tool route as a tool route again between the start point and an endpoint forming a line segment not set as a tool route yet, and
the generating further includes, in searching for a route to be set as a tool route, searching for a first route, which is a route returning to a start point from the start point through another endpoint and in which a same line segment is not reused and a same endpoint is not reused, and, when the first route is found, preferentially setting the found first route as a next tool route.

2. The machining program creating apparatus according to claim 1, wherein, in searching for the route to be set as the tool route, the generating includes:
searching for the first route, a second route, which is a route returning to a start point from the start point through another endpoint and in which a forward route and a backward route overlap with each other, and a third route configured by one line segment,
when the first route is found, setting the found first route as a next tool route in preference to the second route and the third route, and,
when the first route is not present and the second route is found, sets setting the found second route as a next tool route in preference to the third route.

3. The machining program creating apparatus according to claim 1, wherein the creating includes extracting, from tool routes set in the generating, a tool route later in a machining order among a plurality of same tool routes and setting a tool feed speed in the extracted tool route to a rapid feed speed.

4. A machining program creating method for creating a numerical control (NC) machining program for executing character engraving on a workpiece, the method comprising:
generating a plurality of line segments by dividing a line segment forming a character that is a character engraving target at an intersection position of the character;
sequentially executing processing of setting an end point of a set tool route as a start point and setting a line segment connected to the start point as a next tool route; and
creating an NC machining program for machining the character that is a character engraving target along a tool route set at the sequentially executing, wherein
the sequentially executing includes:
first setting of, when a line segment not set as a tool route yet is present among line segments connected to the start point, searching for a route configured by only line segments that include the line segment and are not set as a tool route yet and setting the route found by the search as a next tool route; and
second setting of, when a line segment not set as a tool route yet is not present among the line segments connected to the start point, setting a line segment that is already set as a tool route as a tool route again between the start point and an endpoint forming a line segment not set as a tool route yet, and
the first setting further includes preferred setting of searching for a first route, which is a route returning to a start point from the start point through another endpoint and in which a same line segment is not reused and a same endpoint is not reused, and, when the first route is found, preferentially setting the found first route as a next tool route.

5. The machining program creating method according to claim 4, wherein the preferred setting includes searching for the first route, a second route, which is a route returning to a start point from the start point through another endpoint and in which a forward route and a backward route overlap with each other, and a third route configured by one line segment, when the first route is found, setting the found first route as a next tool route in preference to the second route and the third route, and, when the first route is not present and the second route is found, setting the found second route as a next tool route in preference to the third route.

6. The machining program creating method according to claim 4, wherein the creating further includes setting a tool feed speed in an overlapping tool route among tool routes set at the sequentially executing to a rapid feed speed.

7. A machining program creating method for creating a numerical control (NC) machining program for executing character engraving on a workpiece, the method comprising:
generating a plurality of line segments by dividing a line segment forming a character that is a character engraving target at an intersection position of the character;
sequentially executing processing for setting an end point of a set tool route as a start point and setting a line segment connected to the start point as a next tool route; and
creating an NC machining program for machining the character that is a character engraving target along a tool route set at the sequentially executing, wherein
the sequentially executing includes:
first setting of, when a line segment not set as a tool route yet is present among line segments connected to the start point, searching for a route configured by only line segments that include the line segment and are not set as a tool route yet and setting the route found by the search as a next tool route; and
second setting of, when a line segment not set as a tool route yet is not present among the line segments connected to the start point, setting a line segment that is already set as a tool route as a tool route again between the start point and an endpoint forming a line segment not set as a tool route yet, and
the creating further includes replacing which includes, concerning overlapping tool routes among tool routes set at the sequentially executing, comparing a moving time in fast-feeding a tool in one of the overlapping tool routes and a moving time in moving a tool in another tool route for allowing a tool to escape in a Z-axis direction at a start point of the overlapping tool route and causing a tool to approach in the Z-axis direction at an end point, and, when the moving time required for the overlapping tool route is longer than the moving time required for the another tool route, replacing the overlapping tool route with the another tool route.

8. The machining program creating method according to claim 7, wherein the first setting includes preferred setting of searching for a first route, which is a route returning to a start point from the start point through another endpoint and in which a same line segment is not reused and a same endpoint is not reused, a second route, which is a route returning to a start point from the start point through another endpoint and in which a forward route and a backward route overlap with each other, and a third route configured by one line segment, when the first route is found, setting the found first route as a next tool route in preference to the second route and the third route, and, when the first route is not present and the second route is found, setting the found second route as a next tool in preference to the third route.

* * * * *